(12) United States Patent
Grifka

(10) Patent No.: US 9,273,719 B2
(45) Date of Patent: Mar. 1, 2016

(54) BRACKET HAVING A SECONDARY LOCKING FEATURE FOR ATTACHMENT OF A SHIFT CABLE TO A TRANSMISSION

(71) Applicant: GM GLOBAL TECHNOLOGY OPERATIONS LLC, Detroit, MI (US)

(72) Inventor: John N. Grifka, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 606 days.

(21) Appl. No.: 13/659,985

(22) Filed: Oct. 25, 2012

(65) Prior Publication Data

US 2013/0283956 A1     Oct. 31, 2013

Related U.S. Application Data

(60) Provisional application No. 61/640,312, filed on Apr. 30, 2012.

(51) Int. Cl.
*F16C 1/20* (2006.01)
*F16L 3/10* (2006.01)
*F16C 1/10* (2006.01)

(52) U.S. Cl.
CPC ............. *F16C 1/105* (2013.01); *F16C 2226/74* (2013.01); *F16C 2361/65* (2013.01); *Y10T 74/20049* (2015.01)

(58) Field of Classification Search
CPC .. F16C 1/105; F16C 2226/74; F16C 2350/54; F16C 2361/65; Y10T 74/20049
See application file for complete search history.

(56) References Cited

U.S. PATENT DOCUMENTS

| 6,171,141 | B1 * | 1/2001 | Yasui et al. | 439/545 |
| 2005/0115730 | A1 * | 6/2005 | Odahara et al. | 174/50.54 |
| 2010/0251847 | A1 * | 10/2010 | Gordy | 74/502.6 |

FOREIGN PATENT DOCUMENTS

| CN | 1888482 A | 1/2007 |
| CN | 101539324 A | 9/2009 |
| KR | 03033606 A | 5/2003 |

* cited by examiner

*Primary Examiner* — Terence Boes
(74) *Attorney, Agent, or Firm* — Quinn Law Group, PLLC

(57) ABSTRACT

A bracket assembly is configured for supporting a connector of a shift cable assembly on a transmission. The bracket assembly includes a first section and a second section. The first section defines a groove configured for receiving the connector. The second section is pivotably attached to the first section. The second section is pivotable relative to the first section between an open position and a closed position. The second section is configured for capturing the connector within the groove when the connector is received within the groove and the second section is in the closed position. The second section is configured to allow the connector to be removed from the groove when the second section is in the open position.

13 Claims, 4 Drawing Sheets

BRACKET HAVING A SECONDARY LOCKING FEATURE FOR ATTACHMENT OF A SHIFT CABLE TO A TRANSMISSION

CROSS-REFERENCE TO RELATED APPLICATIONS

This application claims the benefit of U.S. Provisional Application No. 61/640,312 filed on Apr. 30, 2012, which is hereby incorporated by reference in its entirety.

TECHNICAL FIELD

This invention relates to a bracket having a secondary locking feature for attachment of a shift cable to a transmission.

BACKGROUND

Automatic, dual clutch, and hybrid transmissions include an input member to receive torque from an engine or electric machines, an output member to transfer torque to a final drive system, and a gear train with a plurality of clutches that are engageable in various combinations to provide a plurality of speed ratios between the input member and the output member. Automatic transmissions, dual clutch and hybrid transmissions have a plurality of driving ranges, which generally include Park, Reverse, Neutral, Drive, and Low, as understood by those skilled in the art. Some transmissions have a selectively rotatable shaft; the rotational position of the shaft determines which of the driving ranges is selected.

SUMMARY

A bracket assembly is configured for supporting a connector of a shift cable assembly on a transmission. The bracket assembly includes a first section and a second section. The first section defines a groove configured for receiving the connector. The second section is pivotably attached to the first section. The second section is pivotable relative to the first section between an open position and a closed position. The second section is configured for capturing the connector within the groove when the connector is received within the groove and the second section is in the closed position. The second section is configured to allow the connector to be removed from the groove when the second section is in the open position.

A transmission includes a housing, a shift cable assembly, and a bracket assembly. The shift cable assembly includes a cable portion, a connecting rod, and a connector. A bracket assembly includes a first section and a second section. The first section is connected to the housing. The first section defines a groove and the connector is disposed in the groove. The second section is pivotably attached to the first section. The second section is pivotable relative to the first section between an open position and a closed position. The second section captures the connector within the groove when the second section is in the closed position. The second section allows the connector to be removed from the groove when the second section is in the open position.

A vehicle includes a transmission, a shift cable assembly, and a bracket assembly. The rotor shaft is rotatably disposed in the housing. The lever assembly is operatively connected to the rotor shaft. The shifter is configured for being moved to select a desired operating mode of the vehicle. The shift cable assembly is operatively connected to the lever assembly. The shift cable assembly includes a cable portion, a connecting rod, and a connector. The connector is operatively disposed between the cable portion and the connecting rod. The cable portion is operatively connected to the shifter. The connecting rod is operatively connected to the lever assembly. The bracket assembly is operatively connected to the housing. The bracket assembly includes a first section and a second section. The first section is connected to the housing. The first section defines a groove and the connector is disposed in the groove. The second section is pivotably attached to the first section. The second section is pivotable relative to the first section between an open position and a closed position. The second section captures the connector within the groove when the second section is in the closed position. The second section allows the connector to be removed from the groove when the second section is in the open position.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
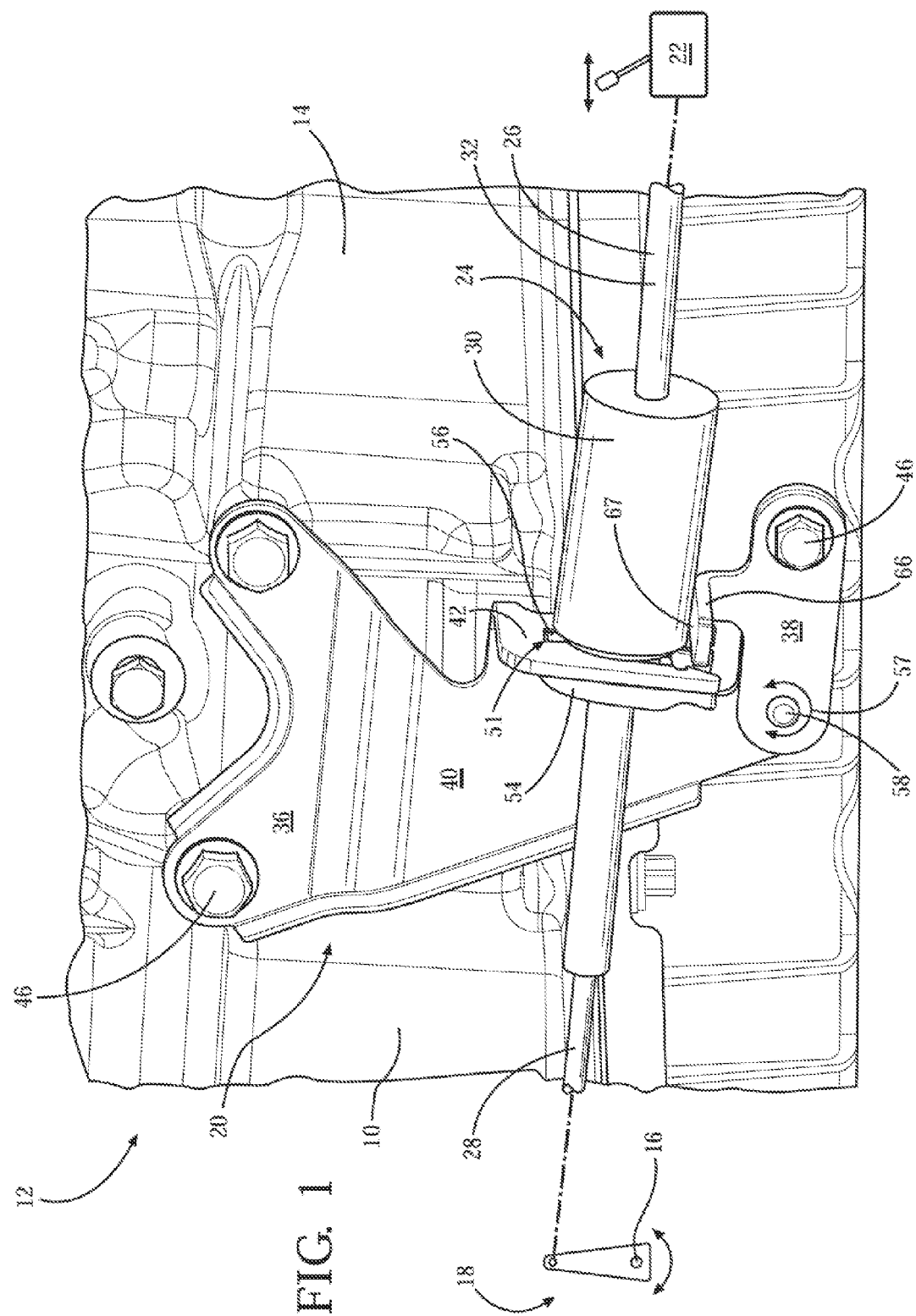
FIG. 1 is a schematic perspective side view of a vehicle having a transmission with a cable assembly, a bracket assembly, a shifter, and a lever assembly.

Referring to the drawings, wherein like reference numbers refer to like components, FIG. 1 shows a transmission 10 within a vehicle 12. The transmission 10 is an automatic transmission which includes a housing 14, a rotor shaft 16, a lever assembly 18, a bracket assembly 20, a shifter 22, and a shift cable assembly 24. The rotor shaft 16 is rotatably disposed in the housing 14 and is configured to provide a plurality of transmission driving ranges, or modes, e.g., park, reverse, neutral, drive, low, and the like. The transmission 10 is configured such that a rotational position of the rotor shaft 16, with respect to the housing 14, determines which of the driving ranges is selected. Each of the positions causes the transmission 10 to operate in a respective one of the driving ranges.

The lever assembly 18 operatively connects the rotor shaft 16 and the shift cable assembly 24. The shift cable assembly 24 is configured to cause rotational movement of the rotor shaft 16 relative to the housing 14. As such, rotation of the rotor shaft 16 provides a plurality of driving range positions, which correspond to a respective one of the predetermined driving ranges.

Figure 2:
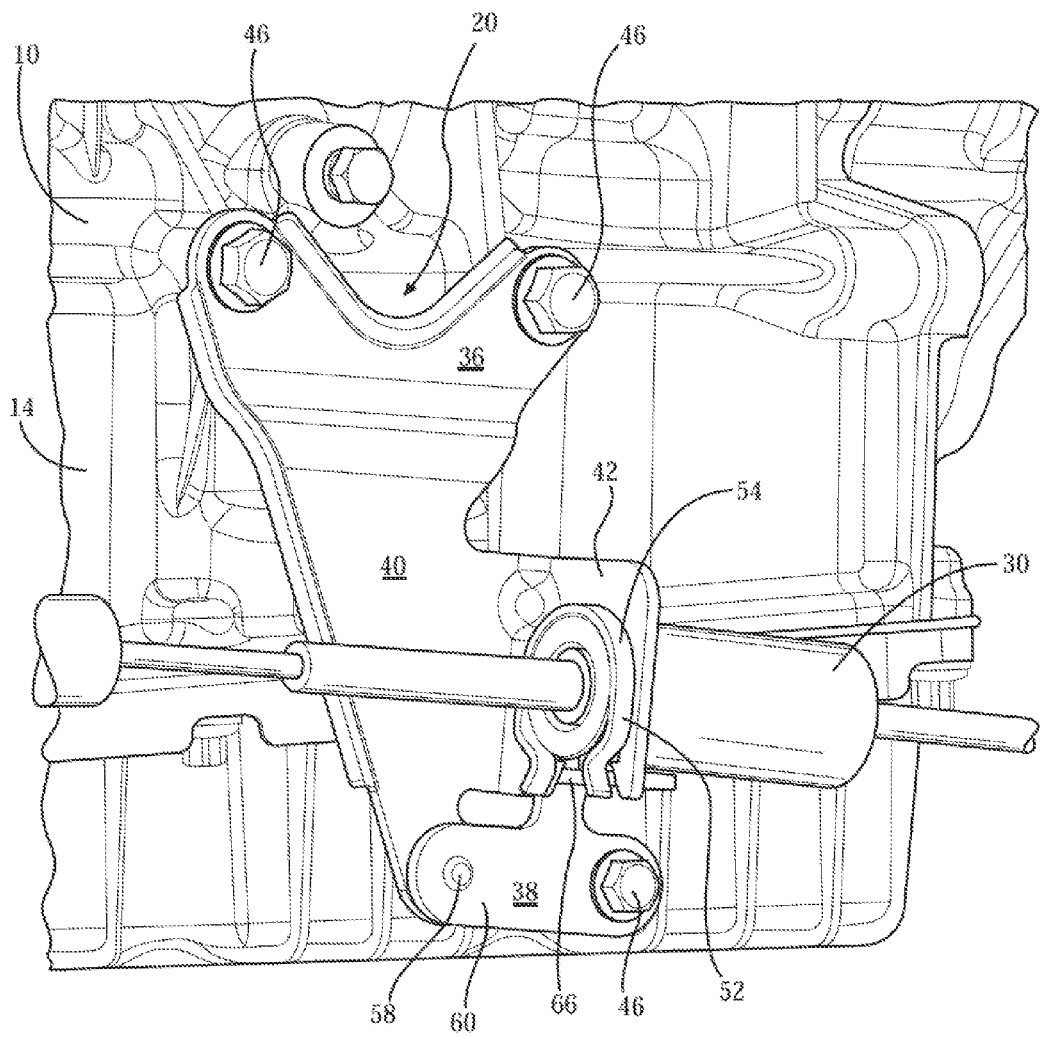
FIG. 2 is a schematic perspective side view of the transmission of FIG. 1.

Referring to FIGS. 1 and 2, the shift cable assembly 24 is operatively attached to the housing 14 via the bracket assembly 20 and the lever assembly 18. The shift cable assembly 24 is also operatively attached to the shifter 22. The shifter 22, in turn, may be operatively connected to a shift lever configured for being moved by a user of the vehicle 12, or by an electric motor assembly, to select the desired operating mode. The bracket assembly 20 is operatively attached to the housing 14. The shift cable assembly 24 is operatively attached to the bracket assembly 20.

Referring to FIGS. 1, 2, and 4-6, the shift cable assembly 24 includes a cable portion 26, a connecting rod 28, and a connector 30. The cable portion 26 is operatively connected to the connecting rod 28 and the connector rod 28 is operatively connected to the lever assembly 18. More specifically, the cable portion 26 is operatively connected between the shifter 22 and the connector 30. A sheath 32 surrounds the cable portion 26 to allow movement of the cable portion 26 relative to the sheath 32. The connector 30 defines a depression 34 extending about an exterior thereof The connector 30 is operatively attached to the sheath 32 and is configured for attachment to the bracket assembly 20, as explained in more detail below. Therefore, when the shift cable assembly 24 is attached to the lever assembly 18, the bracket assembly 20, and the shifter 22, an axial movement of the cable 26 relative to the sheath 32, in turn, causes a corresponding axial movement of the connector rod 28 to move the lever assembly 18 and rotate the rotor shaft 16 to the desired operating mode.

With continued reference to FIGS. 1, 2, and 4-6, the bracket assembly 20 is configured such that the connector 30 of the shift cable assembly 24 is installable in any desired orientation, i.e., from the bottom, from the top, from the front, from the back, and the like. Various terms such as "bottom," "top," "front," "back," and the like are used herein to describe the bracket assembly 20 as oriented in the vehicle 12 with respect to the ground, to facilitate a clear description. However, the use of these words is not intended to be unnecessarily limiting, and it is specifically contemplated that the arrangement can assume various orientations.

Figure 4:
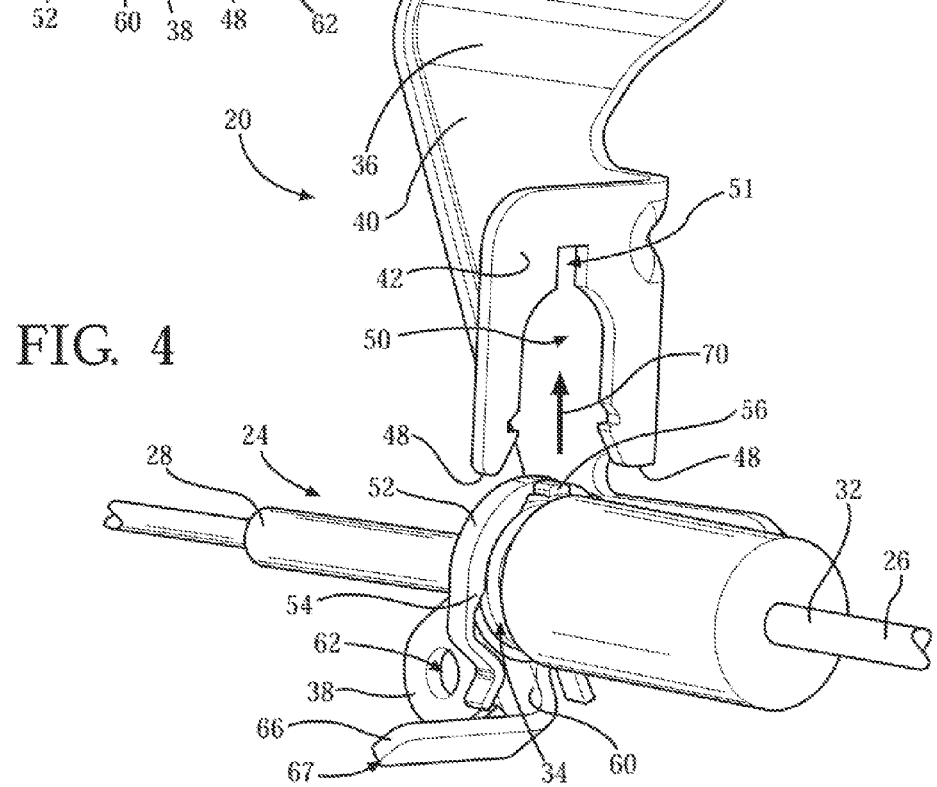
FIG. 4 is schematic perspective side view of the bracket assembly and the cable assembly with the bracket assembly in an open position and the cable assembly removed from the bracket assembly.
Figure 5:
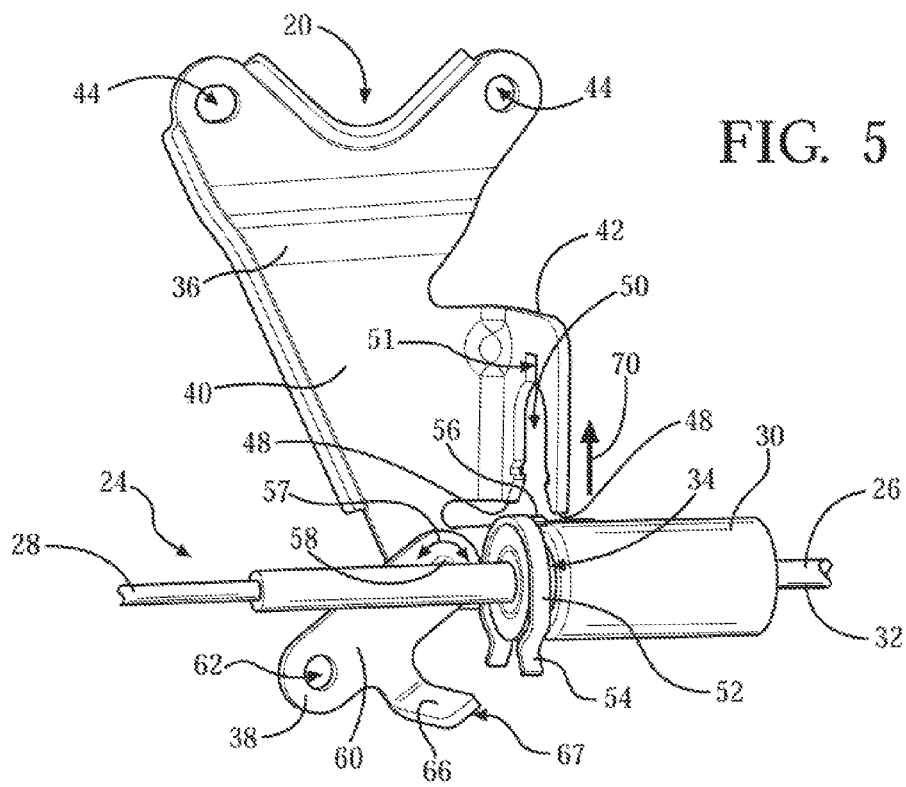
FIG. 5 is a schematic perspective side view of the bracket assembly and the cable assembly with the bracket assembly in the open position.
Figure 6:
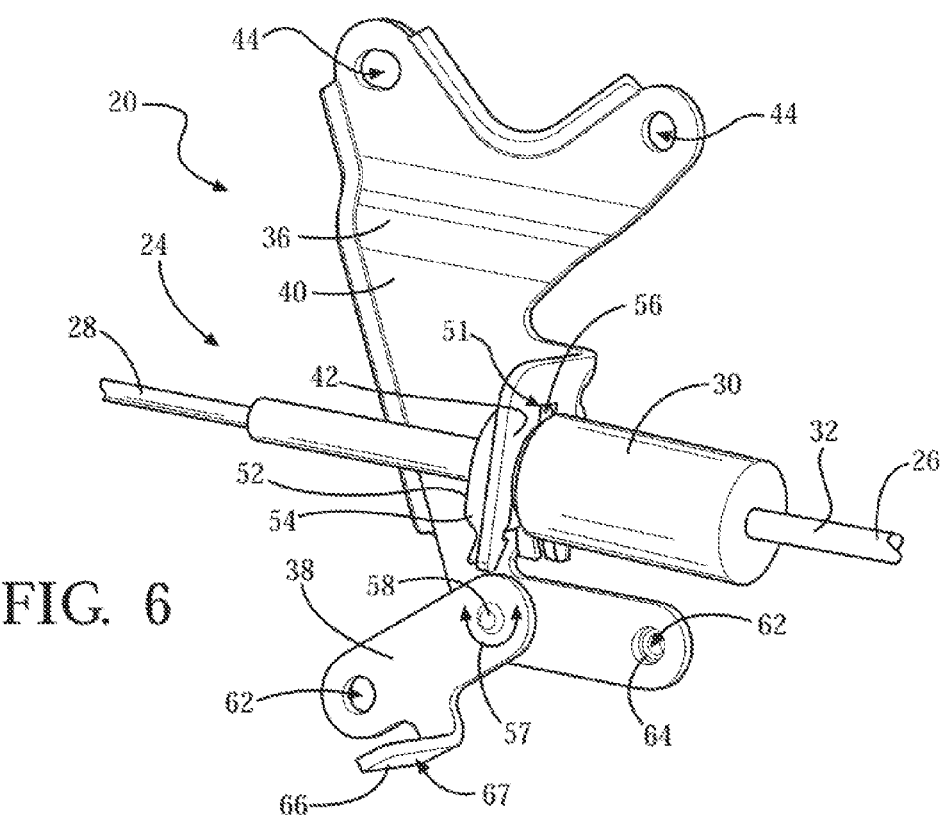
FIG. 6 is a schematic perspective side view of the bracket assembly and the cable assembly with the cable assembly inserted in the bracket assembly and the bracket assembly in the closed position.

Referring to FIGS. 1-6, the bracket assembly 20 includes a first section 36 and a second section 38. As will be explained in more detail below, the second section 38 is pivotally attached to the first section 36 to provide a secondary locking feature to retain the connector 30 of the shift cable assembly 24 to the bracket assembly 20. The first section 36 is attached by the rivet 58 to the second section 38, as shown in FIGS. 1 and 2, and receives the connector 30 therein. The second section 38 is pivoted relative to the first section 36, as illustrated in FIG. 6, such that the connector 30 is captured between the first section 36 and the second section 38, as shown in FIGS. 1, 2, and 6. The second section 38 is subsequently attached to the first section 36 with the fastener 46 secured to the weld nut 64 to prevent pivoting, as illustrated in FIGS. 1, 2, and 6.

Referring to the Figures, the first section 36 includes a base portion 40 and a first flange 42. The base portion 40 defines at least one first attachment hole 44. The base portion 40 defines two first attachment holes 44. It should be appreciated that more or less first attachment holes 44 may be provided. A fastener 46 is inserted through the first attachment holes 44 and secures the first section 36 to the housing 14 of the transmission 10, as shown in FIGS. 1 and 2. The first flange 42 extends from the base portion 40 and presents an edge 48. Referring specifically to FIGS. 4-6, the edge 48 defines a groove 50 having a profile generally corresponding to the depression 34 of the connector 30. More specifically, the groove 50 is configured to receive the connector 30 therein such that the depression 34 of the connector 30 and the first flange 42 are generally intermeshed with one another. The groove 50 is generally U-shaped and the connector 30 and corresponding depression 34 are generally cylindrical. A recess 51 is also defined in the first flange 42. The recess 51 opens to the groove 50 and may face the edge 48. The recess 51 may be generally rectangular in shape.

The connector 30 may include a flexible attachment clip 52 which is axially disposed, adjacent the depression 34. The flexible attachment clip 52 includes a spring portion 54 and a tab 56. The spring portion 54 is configured to be seated within the depression 34 and also snap into the axially adjacent groove 50 defined in the first flange 42. The tab 56 extends from the spring portion 54. The tab 56 is configured to be received by the recess 51 as the spring portion 54 is received by the groove 50. Therefore, as best shown in FIG. 6, when the connector 30 is inserted into the groove 50, the tab 56 fits into recess 51 such that the spring clip 52 and the tab 51 become intermeshed with, or otherwise become interlocked with, the first flange 42. Additionally, the tab 56 may prevent rotation of the connector 30 with respect to the first flange 42. Accordingly, the spring clip 52 and the tab 51 cooperate to axially and radially retain the connector 30 to the first flange 42 of the first section 36.

Figure 3:
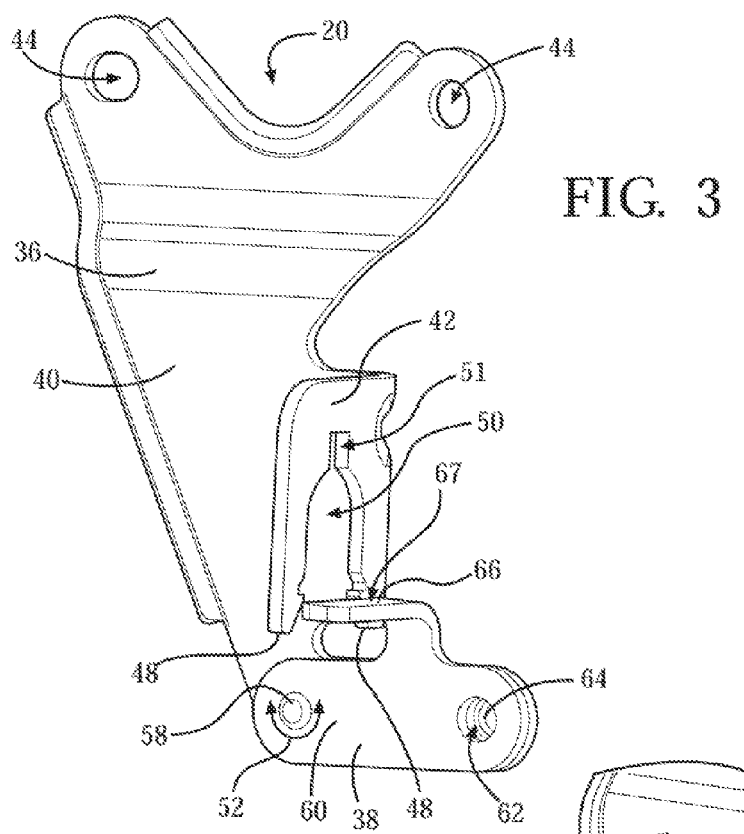
FIG. 3 is a schematic perspective side view of the bracket assembly.

The second section 38 is pivotally attached to the first section 36 such that the second section 38 pivots relative to the first section 36, as indicated by 57. The second section 38 may be pivotally attached to the first section 36 with a rivet 58 to provide a pivoting hinge. It should be appreciated that other pivoting mechanisms may also be used. The second section 38 includes a leg portion 60 and a second flange 66 which extends from the leg portion 60. The second flange 66 presents a support surface 67 and is configured for supporting the connector 30, should the connector 30 become unsnapped from the groove 50. Referring to FIGS. 1-3, 5, and 6, the leg portion 60 of the second section 38 is pivotally attached to the base portion 40 of the first section 36 with the rivet 58. The second section 38 pivots relative to the first section 36 between a closed position, as illustrated in FIGS. 1-3, and an open position, as illustrated in FIGS. 4-6. When the second section 38 is in the closed position, the support surface 67 of the second flange 66 extends in generally perpendicular relationship to the first flange 42, proximate the edge 48, such that the support surface 67 of the second flange 66 is positioned against the connector 30, when the shift cable assembly 24 is inserted in the groove 50. Positioning the second flange 66 against the connector 30, when the bracket assembly 20 is in the closed position, prevents the connector 30 from disengaging from the groove 50 of the first flange 42. Therefore, the connector 30 may be inserted into the groove 50 in any orientation, i.e., from the top, bottom, front, back, and the like, based on the orientation of the groove 50 with respect to the transmission 10. Referring to FIGS. 4 and 5, the connector 30 is inserted from the bottom in an upward direction, as indicated by the directional arrow 70. Therefore, the second flange 66 functions to capture the connector 30, should the spring clip 52 become unsnapped from the groove 50. Likewise, when the second section 38 is in the open position, the second flange 66 is rotated away from first flange 42 and the edge 48 to allow insertion of the connector 30 into the groove 50.

The leg portion 60 and the base portion 40 each define a second attachment hole 62. When the second section 38 is in the closed position, the leg portion 60 overlaps with the base portion 40 of the first section 36 such that the second attachment holes 62 are aligned with one another. A fastener 46 is inserted through the aligned second attachment holes 62 to retain the second section 38 in the closed position. Additionally, a weld nut 64 may be attached to the base portion 40. Accordingly, the fastener 46 extends through the aligned second attachment holes 62 and into the weld nut 64 to secure the leg portion 60 to the base portion 40.

While the best modes for carrying out the invention have been described in detail, those familiar with the art to which this invention relates will recognize various alternative designs and embodiments for practicing the invention within the scope of the appended claims.

The invention claimed is:

1. A bracket assembly configured for supporting a connector of a shift cable assembly on a transmission, the bracket assembly comprising:
  a first section including a base portion and a first flange, the first flange defining a groove configured for receiving the connector;
  a second section pivotably attached to the first section, wherein the second section includes a leg portion and a second flange;
  wherein the second section is pivotable relative to the first section between an open position and a closed position;
  wherein the base portion and the leg portion each define an attachment hole;
  wherein the second flange is configured for capturing the connector within the groove and supporting the connector when the connector is received within the groove and the second section is in the closed position;
  wherein the first and second section each define second attachment holes; wherein the second attachment holes are configured for receiving a fastener therethrough when the second attachment holes are aligned with one another to attach the bracket assembly to the transmission and retain the second section in the closed position; and
  wherein the second section is configured to allow the connector to be removed from the groove when the second section is in the open position.

2. A bracket assembly, as set forth in claim 1, wherein the second section is configured to be fastened to the first section when the second section is in the closed position to prevent pivoting of the second section relative to the first section.

3. A bracket assembly, as set forth in claim 1, wherein the second flange and the first flange are generally planar when the second section is in the closed position; and
  wherein the second flange presents a support surface configured to be positioned against the connector when the shift cable assembly is positioned within the groove and the second section is in the closed position.

4. A bracket assembly, as set forth in claim 1, further comprising:
  a weld nut operatively attached to the base portion such that the base portion is disposed between the weld nut and the leg portion when the second section is in the closed position; and
  a fastener extending through each of the second attachment holes and the weld nut to secure the second section in the closed position.

5. A bracket assembly, as set forth in claim 1, wherein the first flange extends from the base portion and the second flange extends generally perpendicularly from the leg portion such that the first flange and the second flange are in spaced and generally parallel relationship to one another when the second section is in the closed position.

6. A bracket assembly, as set forth in claim 1, further comprising a rivet pivotally connecting the first section and the second section.

7. A transmission comprising:
  a housing;
  a shift cable assembly including:
    a cable portion;
    a connecting rod; and
    a connector; and
  a bracket assembly including:
    a first section connected to the housing;
    wherein the first section includes a base portion and a first flange, wherein the first section defines a groove and the connector is disposed in the groove;
    a second section pivotably attached to the first section, wherein the second section includes a leg portion and a second flange;
    wherein the second section is pivotable relative to the first section between an open position and a closed position;
    wherein the second flange captures and supports the connector within the groove when the second section is in the closed position;
    a weld nut operatively attached to the base portion such that the base portion is disposed between the weld nut and the leg portion when the second section is in the closed position;
    wherein the base portion is fastened to the housing; and
    wherein the first and second sections each define first and second attachment holes; wherein the second attachment holes are configured for receiving
    a fastener extending through each of the leg portion, the base portion, and the weld nut to secure the second section in the closed position;
    wherein the second section allows the to be removed from the groove when the second section is in the open position.

8. A transmission, as set forth in claim 7, wherein the second flange and the first flange are generally planar when the second section is in the closed position; and
  wherein the second flange presents a support surface positioned against the connector when the second section is in the closed position.

9. A transmission, as set forth in claim 7, wherein the first flange and the second flange extend from the respective base portion and leg portion in spaced and generally parallel relationship to one another when the second section is in the closed position such that the support surface extends in generally perpendicular relationship to the first flange.

10. A transmission, as set forth in claim 7, further comprising a rivet pivotally connecting the first section and the second section.

11. A transmission, as set forth in claim 7, wherein the connector defines a depression extending about an exterior thereof; and
  wherein the depression of the connector and the groove of the first flange cooperate with one another such that the first flange and the connector are intermeshed with one another.

12. A transmission, as set forth in claim 11, wherein the first flange defines a recess opening to the groove;
  wherein the connector includes an attachment clip having a spring portion and a tab extending from the spring portion;
  wherein the spring portion is disposed adjacent the depression;
  wherein the spring portion extends into the groove and the tab extends into the recess such that the connector is retained to the bracket assembly.

13. A vehicle comprising:
a transmission including:
- a housing;
- a rotor shaft rotatably disposed in the housing;
- a lever assembly operatively connected to the rotor shaft;
- a shifter configured for being moved to select a desired operating mode of the vehicle;

a shift cable assembly operatively connected to the lever assembly, wherein the shift cable assembly includes:
- a cable portion;
- a connecting rod; and
- a connector operatively disposed between the cable portion and the connecting rod;
- wherein the cable portion is operatively connected to the shifter;
- wherein the connecting rod is operatively connected to the lever assembly;

a bracket assembly operatively connected to the housing, wherein the bracket assembly includes:
- a first section including a base portion and a first flange, wherein the first flange is connected to the housing;
- wherein the first flange defines a groove and the connector is disposed in the groove;
- a second section pivotably attached to the first section, wherein the second flange Includes a leg portion and a second flange;
- wherein the base portion and the leg portion each define an attachment hole;
- wherein the second section is pivotable relative to the first section between an open position and a closed position;
- wherein the second flange captures and supports the connector within the groove when the second section is in the closed position;
- wherein the first and second sections each define second attachment holes; wherein the second attachment holes are configured for receiving a fastener therethrough when the second attachment holes are aligned with one another when the second diction is in the closed position to attach the bracket assembly to the transmission and retain the second section in the closed position; and
- wherein the second section allows the connector to be removed from the groove when the second section is in the open position.

* * * * *